Figure 1:
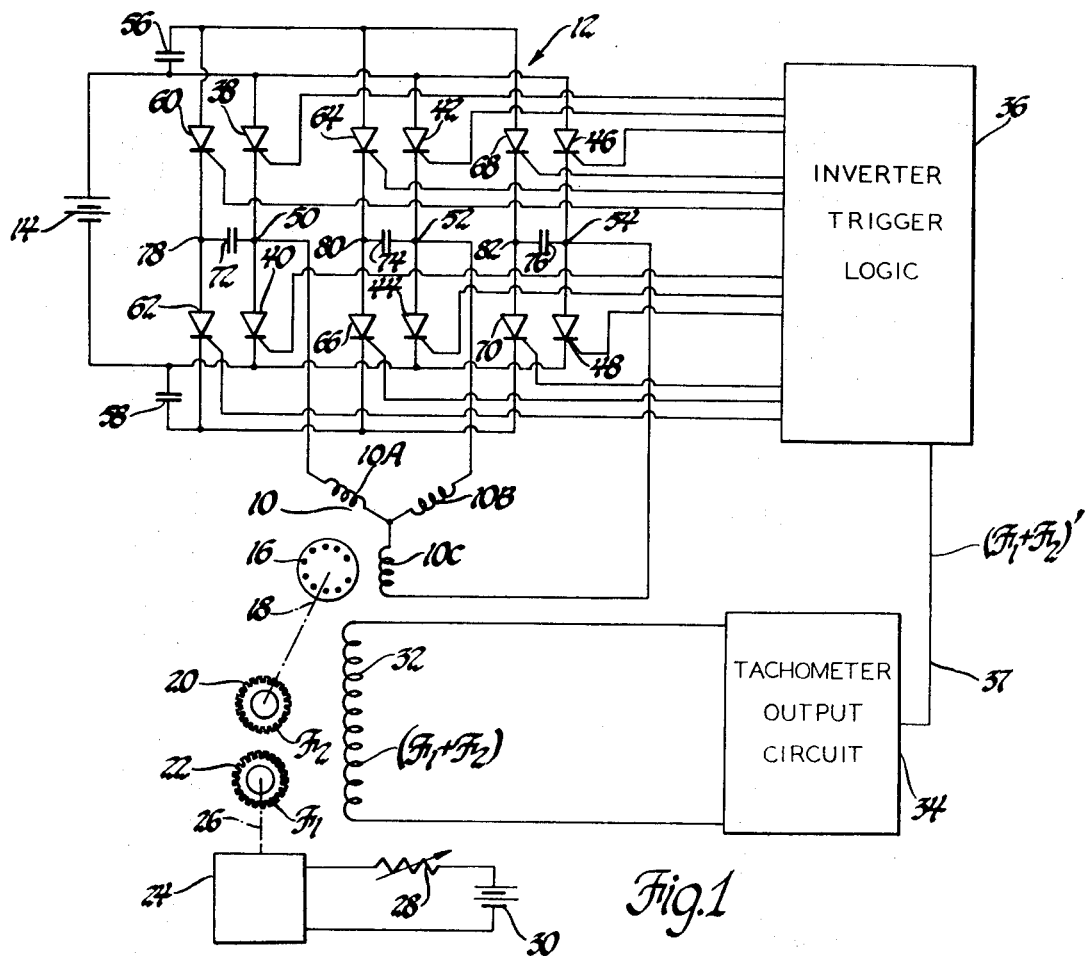

United States Patent

[11] 3,611,090

| [72] | Inventors | Richard W. Johnston<br>Troy;<br>Gary L. Winebrener, Fraser, Mich.;<br>Roland O. Davis, Goleta, Calif. |
|---|---|---|
| [21] | Appl. No. | 60,398 |
| [22] | Filed | Aug. 3, 1970 |
| [45] | Patented | Oct. 5, 1971 |
| [73] | Assignee | General Motors Corporation<br>Detroit, Mich. |

[54] MOTOR CONTROL SYSTEM UTILIZING A SHUTTER WHEEL TACHOMETER
4 Claims, 10 Drawing Figs.

[52] U.S. Cl. ..................................... 318/231,
318/327, 322/31
[51] Int. Cl. ..................................... H02p 5/34,
H02p 5/00
[50] Field of Search .......................... 310/171;
318/231, 327; 322/31

[56] References Cited
UNITED STATES PATENTS
| 2,896,101 | 7/1959 | Laskin | 310/171 |
| 2,958,035 | 10/1960 | Binggeli | 322/31 X |
| 3,339,095 | 8/1967 | Schlabach et al. | 322/31 X |
| 3,471,764 | 10/1969 | Salini et al. | 318/231 |

*Primary Examiner*—Gene Z. Rubinson
*Attorneys*—E. W. Christen and C. R. Meland

ABSTRACT: An electric tachometer for providing an indication of the combined rotational speed of two rotatable members. In this tachometer, the rotatable members are connected respectively with two wheels or discs each of which has conductive teeth on its perimeter. These wheels are disposed in a confronting relationship interior to a spiral wound inductive coil. As the wheels rotate and the teeth alternately are in alignment and misalignment, the instantaneous inductance of the coil is caused to vary. Output terminals connected with the ends of the coil provide a variable inductance whose frequency of variation is correlated with the combined rotational speed of the two rotatable members. This inductance variation is detected by impressing an RF signal across the coil and detecting the resultant amplitude modulation of the RF signal.

INVENTORS
Richard W. Johnston,
BY Gary L. Winebrener, &
Roland O. Davis

C. R. Meland
ATTORNEY

INVENTORS
Richard W. Johnston,
Gary L. Winebrener, &
BY Roland O. Davis

ATTORNEY

MOTOR CONTROL SYSTEM UTILIZING A SHUTTER WHEEL TACHOMETER

This invention relates to an electric tachometer for providing an indication of the relative rotational speed of two discs or wheels provided with metallic protuberances. In particular, the electric tachometer of this invention is suited to provide an indication of the relative rotational speed of the two discs when the discs are carried by two rotatable members.

Tachometers for monitoring the combined rotational speed of two rotatable members are known wherein the magnetic effect of a variable reluctance path is used as an indicating means and wherein the eddy current phenomenon is utilized to provide a signal. A tachometer system utilizing the effects of variable reluctance magnetic paths is disclosed in U.S. Pat. No. 3,471,764, assigned to the assignee of this invention. U.S. Pat. No. 2,896,101 discloses a differential tachometer provided with two separate electrical coils coupled together by eddy currents induced in a conductive member. Each of these tachometers is capable of providing a differential speed signal related to the relative rotations of two shafts.

In contrast to the prior art, the electric tachometer of the present invention utilizes two confronting toothed discs to develop a signal indicative of the relative speed of rotation of the two discs. A coil is disposed in proximity to each of the discs and the coil is arranged to circumferentially encircle both discs. Variations in the coil's inductance are effected as the conductive teeth on the two discs periodically are in alignment and misalignment. These periodic inductance variations have a frequency correlated with the relative speed of rotation of the two discs. To detect the inductance variations, and hence the relative speed of rotation, an RF signal is impressed across the coil's terminals. As a result of the varying inductance, this RF signal is amplitude modulated. A detector is used to detect the modulation which is indicative of the relative speed of rotation of the two toothed discs or wheels.

Accordingly, it is an object of the present invention to provide an electric tachometer capable of indicating the combined rotational speed of two toothed disc members by monitoring the eddy current loading effect of the two toothed discs on an inductive coil.

Another object of the present invention is to provide an electric tachometer capable of indicating the combined rotational speed of two rotatable members wherein the rotatable members carry conductive toothed discs which are disposed in a confronting relationship interior to a spiral inductive coil whose instantaneous inductance is a function of the instantaneous relative positions of the toothed discs and whose inductance varies, when the rotatable members rotate, at a frequency of variation correlated with the combined rotational speed of the two rotatable members.

Still another object of the present invention is to provide an electric tachometer capable of indicating the combined rotational speed of two rotatable members suitable for inclusion in an induction motor slip speed control system operating in a high magnetic field ambient as well as operating in an environment characterized by dust, oil and other physical contaminants.

Yet another object of the present invention is to provide an electric tachometer capable of indicating the combined rotational speed of two rotatable members wherein the tachometer system affords a monitoring scheme sensitive to differences in the speed of rotation of the two rotatable members in a tachometer system characterized by simplicity of design and fabrication.

Figure 2:
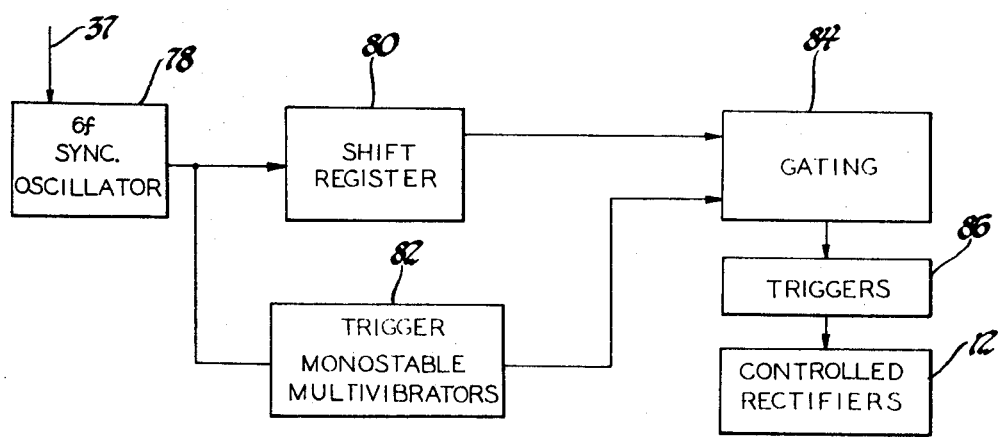
Figure 3:
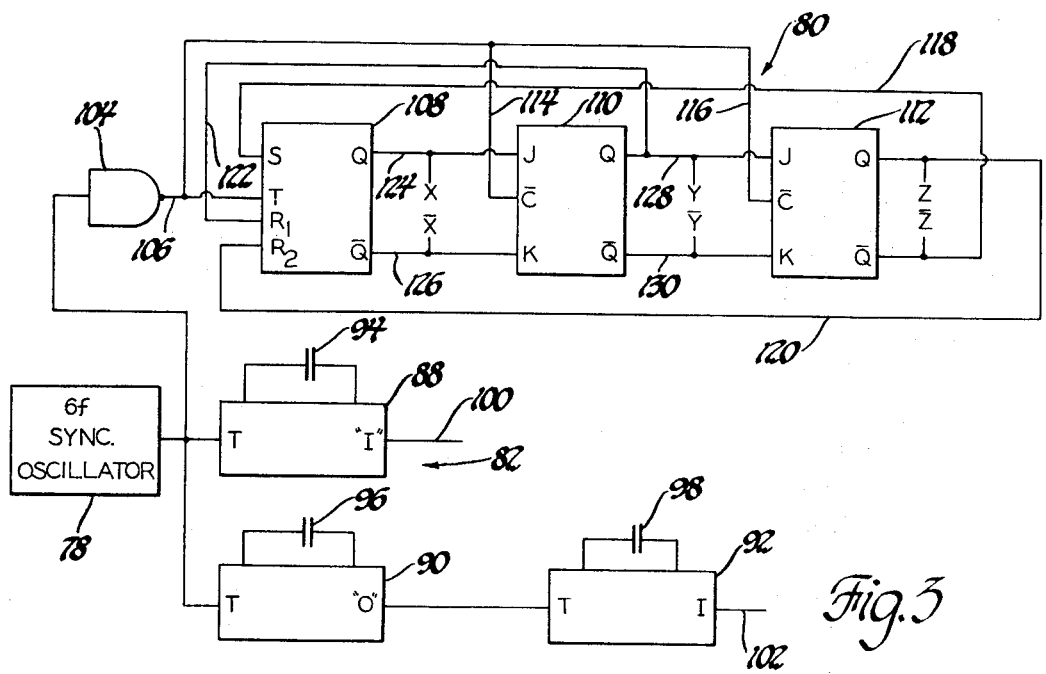
Figure 4:
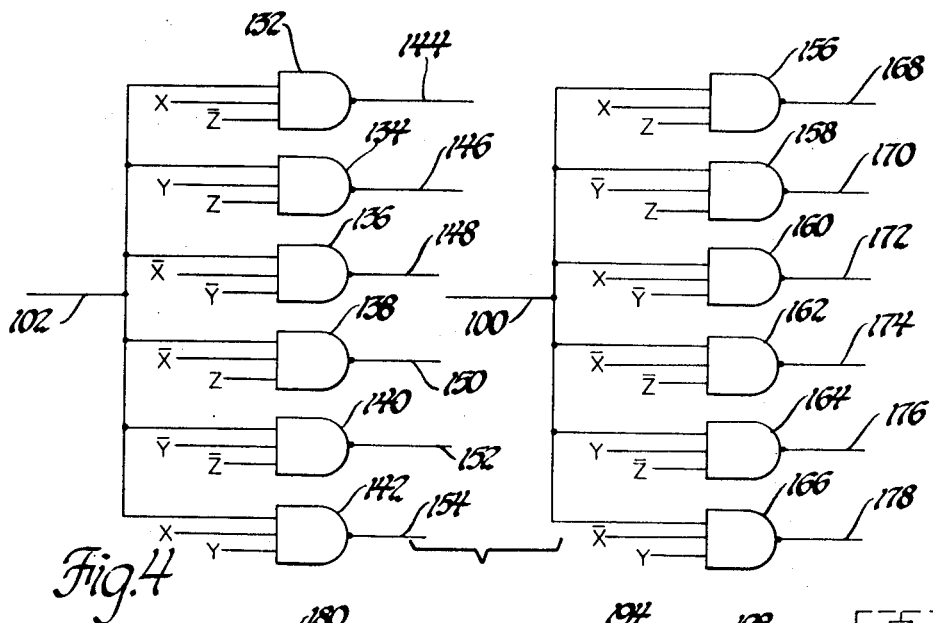
Figure 5:
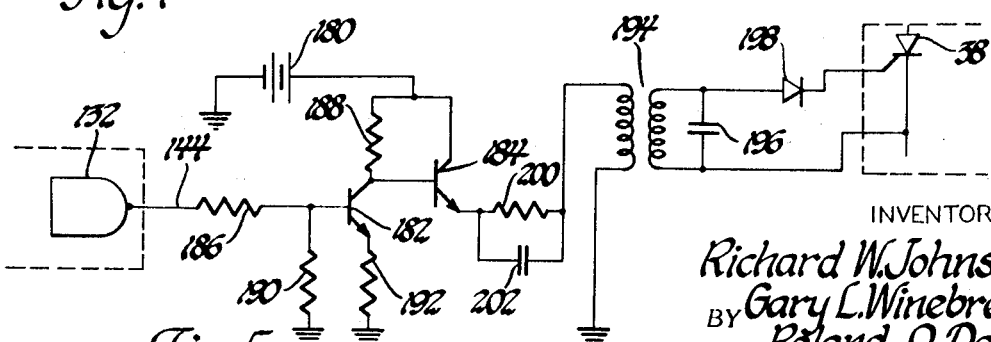
Figure 6:
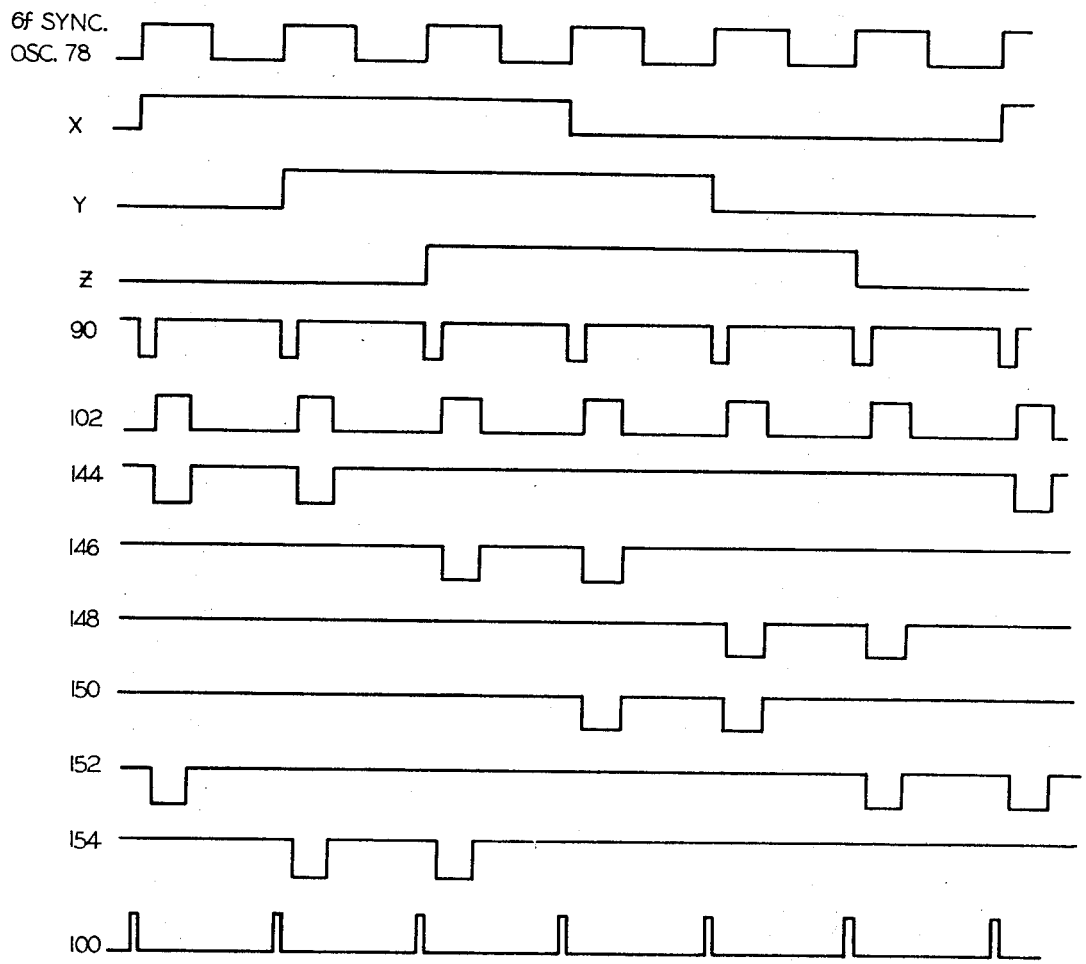
Figure 7:
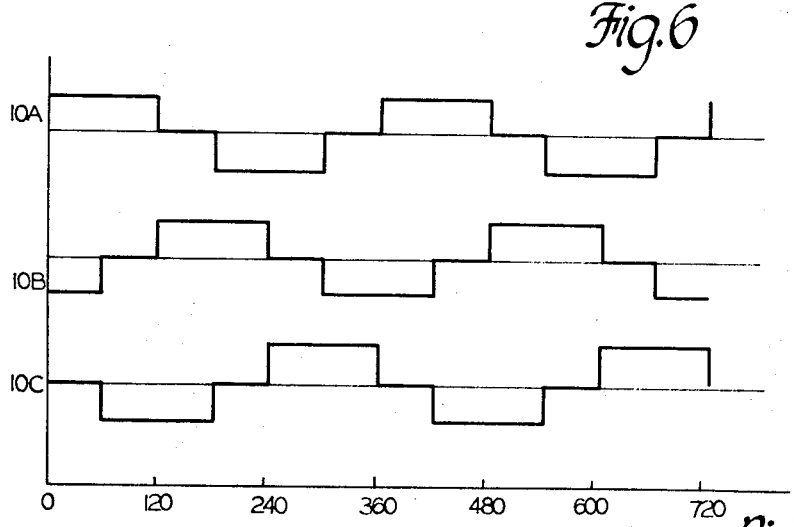
Figure 8:
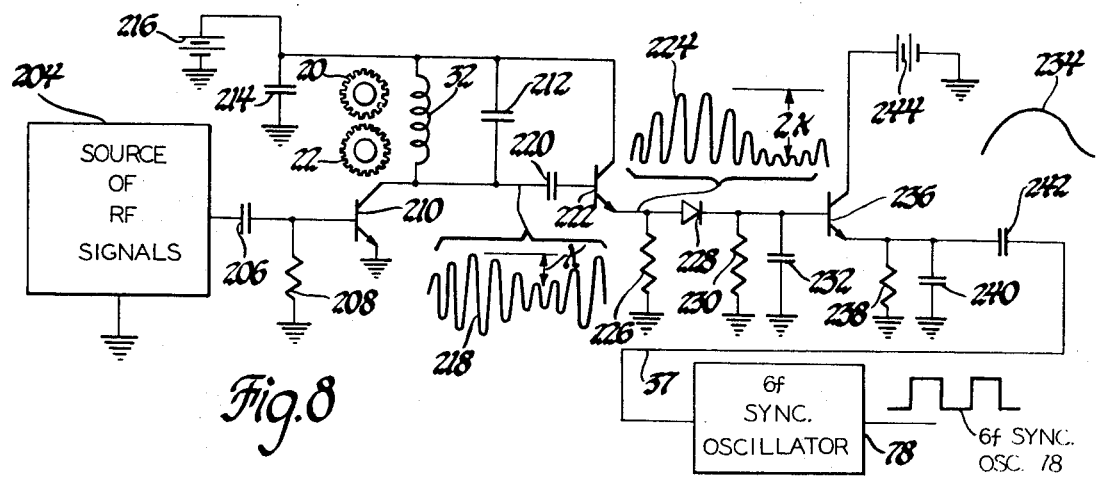
Figure 9:
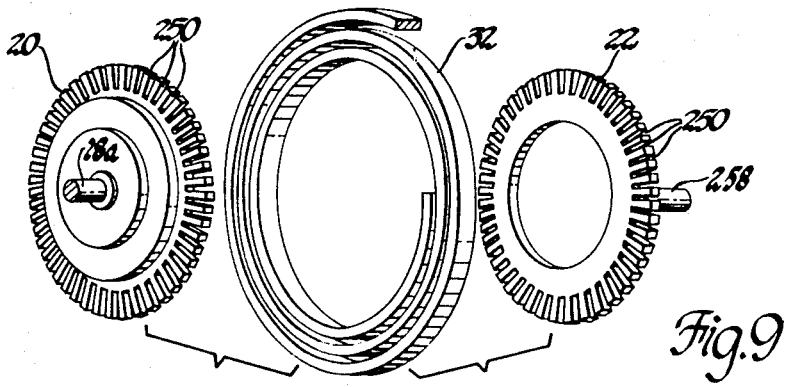
Figure 10:
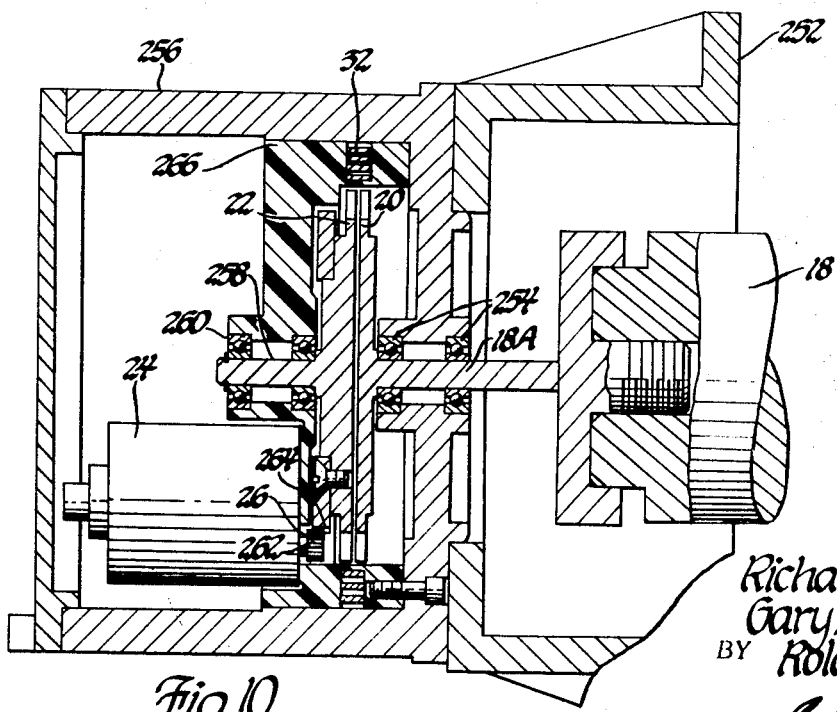

These and additional objects and advantages of this invention will be apparent in light of the following description. The figures listed below are incorporated in the description and illustrate a preferred embodiment of the present invention. In the drawings: FIG. 1 is a circuit schematic of an AC induction motor slip speed control system incorporating the present invention in combination with a DC to AC controlled rectifier inverter for supplying three phase power of a controlled frequency to an AC induction motor. FIG. 2 is a block diagram of the trigger logic network included in FIG. 1 to determine the conductive state of the various controlled rectifiers of the inverter network. FIG. 3 is an expanded block diagram of the shift register and trigger monostable multivibrator blocks of FIG. 2. FIG. 4 is an expanded block diagram of the gating block of FIG. 2. FIG. 5 is a circuit schematic of a trigger representative of the controlled rectifier triggers included in the trigger block of FIG. 2. FIG. 6 is a set of graphs showing the operational characteristics of the various blocks included in FIG. 2. FIG. 7 is a graphic summary of the energization sequence and resulting operation of the induction motor shown in FIG. 1 as effected by the trigger logic circuit control of the controlled rectifier inverter. FIG. 8 is a circuit schematic of the tachometer output circuit included in combination with the two toothed wheels to develop an electrical signal indicative of the combined speed of rotation of the two shafts in FIG. 1. FIG. 9 is an exploded isometric view of the two toothed wheels and the spiral coil included in the tachometer of the present invention. FIG. 10 is an operative arrangement showing the structural relationship of the pair of toothed wheels, their respective drive shafts, and the spiral inductive coil in a preferred tachometer configuration. Referring now to the drawings and more particularly to FIG. 1, an AC induction motor slip speed control system is disclosed wherein an AC induction motor 10 is supplied three phase AC power by an inverter 12 which is connected with a source of direct voltage 14. The squirrel cage rotor 16 of the induction motor 10 is mechanically connected by shaft 18 with a conductive toothed wheel 20 disposed in proximity to a second conductive toothed wheel 22 driven by a slip speed direct current control motor 24 through shaft 26. The speed of control motor 24 is controlled by a variable resistance 28 serially connected with a source of direct voltage 30 which supplies power to the control motor 24. The circuit connecting the control motor 24 and source 30 can include suitable switches (not shown) for controlling the direction of rotation of the motor. An inductive coil 32 is disposed in proximity to both the metallic toothed wheels 20 and 22 in a manner facilitating coupling of electromagnetic fields emanating from the coil with the conductive teeth of both the wheels 20 and 22. In the preferred embodiment of the present invention, toothed wheels 20 and 22 are disposed in a confronting relationship and coil 32 is a spiral sheet coil circumferentially encircling both the toothed wheels 20 and 22. This arrangement is shown in FIGS. 9 and 10 and is more completely described hereinafter. Tachometer output circuit 34 shown more fully in FIG. 8 and described hereinafter develops a signal correlated with the combined rotational speed of the two toothed wheels 20 and 22 and is connected with the inverter logic network 36 by line 37. Inverter logic network 36 provides trigger signals to the controlled rectifiers of inverter 12 and, accordingly, controls the frequency of the electrical power applied the induction motor 10. Inverter logic 36 is more fully shown in FIGS. 2–7 and is described below.

The source of direct voltage 14 is connected with six power controlled rectifiers 38, 40, 42, 44, 46, and 48 to provide power to the induction motor 10. The six controlled rectifiers 38 to 48 are connected in three pairs wherein the cathode of one controlled rectifier of each pair is connected with the anode of the other controlled rectifier of that pair. The three serially connected pairs of controlled rectifiers are connected across the source of direct voltage 14. Thus, it is seen that controlled rectifiers 38 and 40 comprise a pair as noted above wherein the anode of controlled rectifier 38 is connected with the positive potential terminal of the source of direct voltage 14 and the cathode of controlled rectifier 38 is connected with the anode of controlled rectifier 40 whose cathode is connected with the negative potential terminal of the source of direct voltage 14. Similarly, the controlled rectifier pairs including controlled rectifier 42—controlled rectifier 44 and controlled rectifier 46—controlled rectifier 48 are connected as set forth above and shown in FIG. 1.

The three phase windings of the AC induction motor 10 are connected with the output of inverter 12 which comprises the three anode-cathode junctions input the three pairs of controlled rectifiers. Phase winding 10A is connected with output terminal 50 at the controlled rectifier 38—controlled rectifier 40 junction, phase winding 10B is connected with output terminal 52 at the controlled rectifier 42—controlled rectifier 44 junction, and phase winding 10C is connected with output terminal 54 at the controlled rectifier 46—controlled rectifier 48 junction. In this manner, sequential energization of the controlled rectifiers will provide variable frequency AC power to operate the AC induction motor 10. The character of this motor operation is more fully discussed in connection with the summary of inverter logic operation set forth below with reference to FIG. 7.

Inasmuch as the controlled rectifiers 38 to 48 of the inverter 12 of FIG. 1 are supplied direct voltage from the source of direct voltage 14, auxiliary commutation is necessary to terminate a conductive interval for any of the controlled rectifiers. To this end, auxiliary power supplies 56 and 58 are included together with commuting or shut-off controlled rectifiers 60, 62, 64, 66, 68, 70 and commuting capacitors 72, 74 and 76.

The commuting controlled rectifiers 60 to 70 are connected to provide three pairs of controlled rectifiers wherein the cathode of one controlled rectifier of each pair is connected with the anode of the other controlled rectifier of the pair. The three serially connected commuting controlled rectifier pairs are connected between the positive potential terminal of auxiliary power supply 56 and the negative potential terminal of auxiliary power supply 58. Thus, commuting controlled rectifiers 60 and 62 comprise a pair wherein the anode of controlled rectifier 60 is connected with the positive terminal of power source 56 and the cathode of controlled rectifier 60 is connected with the anode of controlled rectifier 62 whose cathode in turn is connected with the negative terminal of power source 58. Similarly, the other commuting controlled rectifier pairs are connected between the positive terminal of power source 56 and the negative terminal of power source 58 as shown in FIG 1. The commuting capacitors 72, 74, and 76 are connected between terminals 78, 80, and 82 of the anode-cathode junctions of the commuting controlled rectifiers and terminals 50, 52, and 54 of the anode-cathode junctions of the power controlled rectifiers. Thus, capacitor 62 interconnects terminal 78 and the anode-cathode junction of commuting controlled rectifiers 60 and 62 with terminal 50 and the anode-cathode junction of power controlled rectifiers 38 and 40. Similarly, capacitors 74 and 76 interconnect the junction 80 of the commuting controlled rectifiers 64 and 66 with the junction 52 of power controlled rectifiers 42 and 44 and the junction 82 of commuting controlled rectifiers 68 and 70 with the junction 54 of power controlled rectifiers 46 and 48, respectively. Commutation is effected by triggering various commuting controlled rectifiers as set forth more fully in U.S. Pat. NO. 3,384,804. In this manner, conductive intervals for the power controlled rectifiers 38 to 48 can be regulated.

The interaction of toothed wheels 20 and 22 which are provided with regularly spaced conductive protuberances or teeth on their circumferences with the inductive coil 32 comprises the essence of the present invention. In its preferred embodiment, the present invention incorporates two substantially identical toothed wheels 20 and 22 provided with regularly spaced teeth and slots which have a geometry such that the airgap slot intermediate any pair of teeth is of a constant width over its entire depth. In this preferred embodiment, the width of each tooth at its base is equal to the width of the airgap slots. The conductive sections of the two wheels 20 and 22 are formed of an electrical conductor such as aluminum.

In operation, the wheels are driven by rotatable shaft 18 which is connected with toothed wheel 20 and induction motor 10 and rotatable shaft 26 which is connected with toothed wheel 22 and control motor 24. In view of their face-to-face relationship and the proximity of coil 32 which as noted above circumferentially encircles both toothed wheels, inductance variations are developed in the inductive coil 32 in response to rotation by either or both the metallic toothed wheels. To detect the resultant inductance variations, the tachometer output circuit 34 impresses an RF signal on inductive coil 32 which is radiated in a manner whereby eddy currents are induced in the conductive teeth of both the toothed wheels 20 and 22. These eddy currents manifest their existence by causing the inductive coil 32 to undergo variations in its inductance as the teeth periodically are in alignment and misalignment.

The electromagnetic interconnection between the inductive coil 32 and the toothed wheels 20 and 22 is best comprehended by viewing the elements as primary and secondary transformer windings. As the metallic toothed wheels rotate, the alignment of the respective teeth of the two wheels continually cyclically varies from direct alignment wherein the axial appearance of the two wheels is the same as if only one wheel existed to complete misalignment wherein the teeth of each wheel complement the teeth of the other wheel in a manner such that the axial appearance of the combination is the same as if a single solid wheel were present. Considering the transformer analogy, the RF energized coil 32 is considered the primary winding of the transformer and the conductive teeth on the toothed wheels 20 and 22 represent the transformer secondary. When the teeth are in alignment such that the circumference of the two toothed wheels appear axially as approximately 50percent airgap and 50percent conductive teeth, the effective loading of the coil 32 is less than it is when the wheels are misaligned such that the teeth of one wheel complement the teeth of the other wheel to provide a continuously metallic circumference. The loading in the two orientations of the conductive wheels 20 and 22 on the coil 32 is substantially different and should be understood to cause inductance variances.

In the induction motor control system of FIG. 1, the conductive toothed wheel 22 is driven by a control motor 24, as noted above, which determines the slip frequency of the motor control system. The conductive toothed wheel 22 has a speed of rotation which for purposes of discussion is identified as a frequency $F_1$ and the conductive toothed wheel 20 connected with the rotor 16 of induction motor 10 has a speed of rotation characterized by frequency $F_2$. Accordingly, the inductance of the inductive coil 32 varies at a frequency which is a function of the sum of the combined speeds of the two wheels when the wheels rotate in opposite directions and as noted in FIG. 1, this variance has a frequency related to $(F_1+F_2)$. It is noted that in the alternative the two wheels could be caused to rotate in the same direction rather than in opposite directions, In that situation, the inductance of coil 32 would vary at a frequency correlated with the difference of the speed or frequencies of the two wheels and, accordingly, would be related to $(F_2-F_1$.For application in a slip frequency control system for an induction motor, the frequencies are added for motoring operation. If the frequencies were subtracted, the motor could be operated in a generator or braking mode. The balance of this discussion will proceed in terms of and be limited to the situation where the frequencies are added. The tachometer output circuit 34 detects the inductance variations and provides a signal at its output related thereto. This output signal is denoted in FIG. 1 as $(F_1+F_2)'$ and as shown there it is supplied to the inverter trigger logic 36 by line 37. Thus, the inverter 12 is switched at a frequency related to $(F_1+F_2)'$ which in turn is related to the combined rotational speed of toothed wheels 20 and 22. The induction motor 10 is accordingly provided energy at a frequency $(F_1+F_2)''$ which causes its rotor to rotate at a speed characterized by frequency $F_2$. Thus, it is seen that the slip frequency of the induction motor 10 is regulated by the speed of rotation $F_1$ of the control motor 24 connected with metallic toothed wheel 22 and this slip frequency can be varied by varying the speed of rotation of motor 24.

The inverter trigger logic 36 of FIG. 1 will now be explained in greater detail in connection with FIGS. 2-6 which illustrate components of logic circuit 36. Referring to FIG. 2, a block diagram is shown wherein a 6f. sync. oscillator block 78 provides input signals to a shift register 80 and to trigger monostable multivibrators 82 which in turn are connected with gating circuits 84. The frequency of the oscillator 78 is exactly six times the frequency of the power supplied motor 10 by the inverter 12. As shown in FIG. 2, the gating circuits are connected with and control 12 triggers 86 which provide trigger signals to their respective controlled rectifiers of the inverter 12 of FIG. 1. The operation of the various blocks of the block diagram network of FIG. 2 is described hereinafter with reference to FIGS. 3–6.

Referring now to FIG. 3, the 6f. sync. oscillator 78 is shown together with the shift register 80 and the trigger monostable multivibrators 82 with which it is connected. The signal available from the oscillator 78 is shown graphically in FIG. 6 and is there labeled 6f. sync. osc. 78. It is noted that the 6f. sync. oscillator 78 determines the frequency of operation of the inverter 12 of FIG. 1 and the FIG. 6 signal has a frequency, as noted above, exactly six times the repetition rate of the inverter. Accordingly, when the frequency of operation of the inverter 12 of FIG. 1 is to be changed, it is only necessary to change the frequency of the 6f. sync. oscillator. Considering the slip frequency control system of FIG. 1, it should be appreciated that the output signal $(F_1+F_2)'$ on line 37 from the tachometer output circuit 34 regulates the frequency of the 6f. sync. oscillator 78 to effect control over the output frequency of inverter 12. This regulation is described more fully hereinafter in conjunction with FIG. 8.

The 6f. sync. oscillator 78 is connected with two monostable multivibrator circuits in FIG. 3. The monostables 88, 90, and 92 employed in these two monostable circuits are commercially available units and are typified by Motorola semiconductor units having catalog designation MC667. Each of the three monostables is provided with a timing capacitor and, accordingly, the capacitors 94, 96, and 98 of FIG. 3 connected with monostables 88, 90, and 92, respectively, provide timing control of the respective monostable multivibrators.

Monostable multivibrator 88 is included to provide trigger signals for the commuting or shut-off controlled rectifiers 60 through 70 of FIG. 1. The output from this monostable multivibrator on conductor 100 of FIG. 3 is shown graphically in FIG. 6, there being denoted 100. It is appreciated that the pulses comprising signal 100 occur at the frequency of the 6f. sync. osc. 78 signal also shown in FIG. 6 and the pulses of signal 100 occur at the beginning of each cycle of the 6f. sync. osc. 78 signal.

Monostable multivibrators 90 and 92 cooperate to provide a signal on conductor 102 which is a prerequisite to providing proper gate signals to power controlled rectifiers 38 through 48 in FIG. 1. The signal 102 is shown in FIG. 6 and is there labeled 102. It is noted that signal 102 like signal 100 has a frequency equal to that of the 6f. sync. osc. 78 signal of FIG. 6. However, the pulses which comprise signal 102 are time shifted from those which comprise signal 100. This time shift represents a time delay in the signal 102 pulse train introduced by the monostable multivibrator 90. Signal 90 of FIG. 6 shows the increment of the time delay introduced by monostable multivibrator 90 at the beginning of each cycle of the 6f. sync. osc. 78 signal. The time delay introduced in the pulse train 102 of FIG. 6 is necessary to ensure that adequate time is allowed to shut-off power controlled rectifiers to be terminated prior to gating additional power controlled rectifiers conductive.

The 6f. sync. oscillator 78 in FIG. 3 is connected with a NAND logic element 104 which causes an inversion of the signal shown in FIG. 6 and labeled 6f. sync. osc. 78. As a consequence, the signal available on conductor 106 at the output of the NAND logic element 104 is the inverse of that shown in FIG. 6 as 6f. sync. osc. 78.

Three flip-flop circuits 108, 110, and 112 provide a shift register function to generate six essential signal outputs noted X, $\overline{X}$, Y, $\overline{Y}$, Z, and $\overline{Z}$ in FIG. 3. Signals, X, Y and Z are depicted in FIG. 6 and are there labeled X, Y and Z. The three remaining signals $\overline{X}$, $\overline{Y}$ and $\overline{Z}$ which are merely the inverse of the three signals represented in FIG. 6 are not shown. It is appreciated that $\overline{X}$ being merely the inverse of X has a high value during those time intervals in which X is characterized by a low value and $\overline{X}$ has a low value during those time intervals in which X has a high value. Similarly, $\overline{Y}$ and $\overline{Z}$ are related to Y and Z in an inverse fashion.

The three flip-flops 108, 110, and 112 cooperate to generate the requisite signals X, $\overline{X}$, Y, $\overline{Y}$, Z and $\overline{Z}$. These flip-flops are of a conventional design which is commercially available. A typical flip-flop suitable for use as flip-flop 108 is Motorola's MC664. Motorola's MC663 is suitable for the flip-flop functions of flip-flops 110 and 112 of FIG. 3.

Continuing the description of the FIG. 3 shift register arrangement, conductor 106 is connected conductively with the T input of flip-flop 108 and is connected by conductors 114 and 116 with the $\overline{C}$ inputs of flip-flops 110 and 112. The $\overline{Q}$ output of flip-flop 112 is connected by conductor 118 with the S input of flip-flop 108. The Q output of flip-flop 112 is connected by conductor 120 with the $R_2$ input of flip-flop 108. The Q output of flip-flop 110 is connected with the $R_1$ input of flip-flop 108 by conductor 122. Conductors 124 and 126 connect the Q and $\overline{Q}$ outputs of flip-flop 108 with the J and K inputs of flip-flop 110, respectively. Conductors 128 and 130 connect the Q and $\overline{Q}$ outputs of flip-flop 110, respectively, with the J and K inputs of flip-flop 112. In this manner, the necessary connections among the three flip-flops are completed such that the flip-flops provide the requisite X, $\overline{X}$, Y, $\overline{Y}$, Z, and $\overline{Z}$ outputs at the outputs indicated in FIG. 3.

FIG. 4 shows the trigger logic controls associated with the controlled rectifiers of FIG. 1 and represented as gating block 84 in FIG. 2.

Conductors 100 and 102 of FIG. 3 which carry signals 100 and 102 of FIG. 6 provide an input for the NAND logic elements of FIG. 4 on conductors similarly identified as 100 and 102. The pulses of signal 102 of FIG. 6 are connected with one input of each of six three input NAND gates 132, 134, 136, 138, 140, and 142 which determine the gating of the power controlled rectifiers 38 to 48 of FIG. 1. The six signals X, $\overline{X}$, Y, $\overline{Y}$, Z, and $\overline{Z}$ provide two input signals to each of the six NAND gates 132 through 142. Thus, it is seen that NAND gate 132 is supplied signal X, signal $\overline{Z}$ and signal 102 to its three inputs. The remaining five NAND gates 134 to 142 are similarly connected with signal 102 and two of the six signals provided by the shift register 80 of FIG. 3 which are indicated by the alphabetic notation at the various inputs of the NAND gates 132 to 142 of FIG. 4.

The NAND gates 132 to 142 provide a high value output until and unless all three of their inputs are connected with a high value input. Accordingly, the output signals from NAND gates 132 through 142 on conductors 144 through 154 are at their high value except for those time intervals during which all three inputs to the respective gates are at a high level. It is noted that the signals X, Y and Z of FIG. 6 are identical waveforms time shifted from each other. Similarly, it should be appreciated that signals $\overline{X}$, $\overline{Y}$ and $\overline{Z}$ are identical to those shown but are further time phase shifted; the result being that no two of the six signals have the same phase. Thus, it should be appreciated that the NAND gates 132 through 142 of FIG. 4 sequentially and periodically provide low output levels on conductors 144 through 154. These low output levels are constrained to occur in those time intervals during which signal 102 of FIG. 6 is at its high level. Additionally, the various NAND gates provide low output levels only if the remaining two inputs of the particular NAND gate are at their high levels. The resultant output pulses are shown in FIG. 6 and are there identified by the number of the output conductor associated with the particular NAND gate.

In a similar fashion, the six NAND gates 156 through 166 connected with conductor 100 in FIG. 4 provide periodic low value output signals, which are not shown, on conductors 168 through 178. Each of these six NAND logic gates 156 through 166, like the six NAND logic gates 132 through 142, is connected with two of the six signals X, X̄, Y, Ȳ, Z and Z̄ as well as the shut-off pulse signal 100. Inasmuch as the various signals connected with the inputs are time displaced, the respective NAND gate outputs on conductors 168 through 178 are likewise time displaced. The output signals on conductors 168 through 178 supply gate signals to the shut-off controlled rectifiers 60 through 70 of FIG. 1. It should be appreciated that the various shut-off controlled rectifiers are thus sequentially and periodically supplied gate pulses constrained to the time intervals in which signal 100 in FIG. 6 has a high value.

Referring now to FIG. 5, a representative trigger circuit is shown which is included together with eleven other identical trigger circuits in triggers block 86 of FIG. 2. The trigger circuit of FIG. 5 is shown connected with power controlled rectifier 38 of FIG. 1. The input to this trigger circuit is connected with the output of NAND gate 132 on conductor 144 which was described above and is shown in FIG. 4. Accordingly, the trigger circuit is supplied periodic trigger pulses which determine the beginning of a conductive interval for controlled rectifier 38.

The trigger circuit comprises a source of direct voltage 180, two transistors 182 and 184, bias and load resistors 186, 188, 190 and 192, coupling transformer 194, a transient capacitor 196, conventional diode 198, and a shunt RC connection comprising resistor 200 and capacitor 202.

In operation, transistor 182 is maintained in its conductive state throughout the time period in which signal 144 of FIG. 6 has a high value. Transistor 184 is biased nonconductive when transistor 182 is conductive as a result of the connection between the base of transistor 184 and the collector of transistor 182. When signal 144 of FIG. 6 falls to a low value, transistor 182 is caused to cease conduction. At this time, transistor 184 is biased conductive by the source of direct voltage 180. When transistor 184 commences conduction, a signal is provided the primary winding of transformer 194 through the shunt RC combination of resistor 200 and capacitor 202. The secondary of transformer 194 provides a gate signal to power controlled rectifier 38 which is filtered by capacitor 196 and constrained to unidirectional current by diode 198. In this manner, the controlled rectifier 38 is gated conductive upon the occurrence of a signal from NAND gate 132.

The triggers block 86 of FIG. 2 includes 12 circuits identical to that shown in FIG. 5 and described above. Each of the power controlled rectifiers 38 through 48 of FIG. 1 as well as each of the commuting or shut-off controlled rectifiers 60 through 70 is connected with a respective trigger circuit identical to that shown and described. In this manner, the requisite control of the conductive states of the various controlled rectifiers obtains.

FIG. 7 shows graphically the energization of the phase windings 10A, 10B, and 10C of the induction motor 10 of FIG. 1. It is appreciated that this graphical representation of the induction motor energization periods is a composite of the controlled rectifier switching sequence inasmuch as the necessary gating to initiate and terminate the various power pulses is effected by the trigger logic 36 of FIG. 1. Each of the three phase windings of induction motor 10 of FIG. 1 is seen in FIG. 7 to be provided power during two 120° intervals of the 360 electrical degrees of each cycle. These voltages supplied the various phase windings are alternately positive and negative as shown in FIG. 7.

Considering FIG. 7 in combination with FIG. 1, it is appreciated that phase winding 10A is supplied positive voltage when controlled rectifier 38 is conductive. This corresponds to the first 120° in the FIG. 7 graph. Shut-off controlled rectifier 60 is provided a trigger pulse at the 120° point gating it conductive and concomitantly terminating conduction in power controlled rectifier 38. Referring to FIGS. 1 and 7, it is seen that current supplied the phase winding 10A for the first 60° is provided a return path to the negative potential terminal of the source of direct voltage 14 through phase winding 10B and conducting power controlled rectifier 44. At the 60° point, controlled rectifier 44 is rendered nonconductive by nature of commuting controlled rectifier 66 being gated conductive. After a short time delay as shown in FIG. 6, power controlled rectifier 48 is gated conductive by the signal 154 from NAND gate 142 of FIG. 4 and current now flows from the positive terminal of source 14 through power controlled rectifier 38, phase windings 10A and 10C, and power controlled rectifier 48 to the negative terminal of source 14. The remaining graphical information is comprehended in a manner identical with the 120° example. It is noted that power controlled rectifier 38 was supplied a gating pulse at 60 electrical degrees according to the signal 144 shown in FIG. 6. Each of the power controlled rectifiers is supplied a gating pulse at the 60° point of its 120 electrical degree conduction interval to ensure against premature termination of the conduction interval for the power controlled rectifier. It should be appreciated that the frequency of the power supplied the induction motor 10 of FIG. 1 is determined by the switching frequency of the controlled rectifiers in inverter 12 of FIG. 1 which as noted above is controlled by the 6f. sync. oscillator signal which in turn is controlled by the combined rotational speeds of wheels 20 and 22.

Referring now to FIG. 8, the tachometer circuit represented as tachometer output current 34 in FIG. 1 is shown in detail. The two toothed wheels 20 and 22 are shown to be in proximity with inductive coil 32 in a manner analogous to that of FIG. 1.

In FIG. 8, a source of RF signals 204 is connected with a coupling capacitor 206 and a bias resistor 208 for connection to the base of transistor 210. The inductive coil 32 in combination with capacitor 212 provide a parallel resonant LC tank circuit. One terminal of this parallel resonant LC tank circuit is connected with the collector electrode of transistor 210. The second terminal of the LC tank circuit is connected with RF ground by means of RF bypass capacitor 214. DC power is applied to this second terminal of the LC tank circuit by the DC source 216. In operation, transistor 210 functions as an RF amplifier providing amplification for RF signals supplied by the source 204 to the transistor 210. DC source 216 provides the power necessary to perform the amplification.

As noted above, the inductance of coil 32 varies as the two toothed wheels 20 and 22 rotate relative to each other. Accordingly, relative rotation of the two toothed wheels 20 and 22 causes the RF signal which is developed across the LC tank circuit comprised of coil 32 and capacitor 212 to be amplitude modulated. The resultant amplitude modulated RF signal is graphically represented in FIG. 8 and is there labeled 218. The peak-to-peak amplitude of the modulation envelope is denoted K in the FIG. 8 representation. The sinusoidal character of the modulation results from the geometry of the conductive teeth. Various tooth geometries would produce different modulation waveforms.

Capacitor 220 and transistor 222 cooperate to provide a clamp function wherein the modulation envelope of the amplitude modulated RF signal 218 is doubled and signal 224 is developed across the emitter resistor 226 at the output of the emitter follower which includes transistor 222. As noted in FIG. 8, the modulation envelope of signal 224 has an amplitude 2K. The signal 224 at the output of the emitter follower stage comprising transistor 222 is applied to a conventional diode detector network which includes diode 228, resistor 230, and capacitor 232. In this manner, the modulation is separated from the RF signal and the modulation envelope shown in FIG. 8 and denoted 234 is obtained. The modulation envelope 234 is depicted as it appears at the output of a second emitter follower stage comprising transistor 236, resistor 238, and capacitors 240 and 242. This emitter follower stage is powered by a source of direct voltage 244. The sinusoidal signal 234 is connected by line 37 with the 6f. sync. oscillator 78 cited above and shown in FIGS. 2 and 3 as well as FIG. 8. The 6f. sync. osc. 78 signal depicted in FIG. 8 is the same as the FIG. 6 signal discussed above. Thus, it is seen that the tachometer determines the frequency of the 6f. sync. oscillator and, subsequently, as noted and explained above, the frequency of the power supplied the induction motor under control.

Referring now to FIG. 9, the orientation of the metallic toothed wheels 20 and 22 and inductive coil 32 is shown in the preferred embodiment of the tachometer. The FIG. 9 drawing is an exploded view in isometric projection of the three component members that comprise the toothed wheel and coil arrangements of the present invention. In the assembled configuration, the two wheels are disposed in a confronting spaced apart axially aligned arrangement interior to the spirally wound foil coil 32 which thus circumferentially encircles both wheels. It is noted that slots 250 separating various pairs of teeth on each of the wheels 20 and 22 are provided such that the two sidewalls of the various slots are parallel. In this manner, the slot width is appreciated to be uniform throughout the entire depth of the slot as noted above. Additionally, it is noted that in the preferred embodiment the width of the tooth at the base of the tooth is equal to the width of the slots. Accordingly, it is appreciated that the width of each tooth along the outer circumference of the wheel exceeds the width of the slots intermediate pairs of teeth and the width of the tooth at its base.

FIG. 10 shows an arrangement for carrying forward the advantages of the present invention in an induction motor slip speed control system. The configuration shown in FIG. 10 can be readily mounted to the end frame of the induction motor whose slip frequency is to be controlled.

In this arrangement, the housing member 252 is secured to the end frame of the induction motor. The shaft 18 connected with the induction motor's rotor is connected to shaft 18A which in turn drives the metallic toothed wheel 20. Shaft 18A is journaled for rotation in bearings 254. The second metallic toothed wheel 22 is mounted in a housing 256 which supports the control motor 24 and the metallic toothed wheel 22. The metallic wheel 22 has a shaft 258 journaled for rotation in bearing 260. Both the conductive wheels 20 and 22 are formed of aluminum. The control motor 24 has an output shaft 26 which carried a drive gear 262. This gear 262 meshes with a gear 264 secured to the conductive wheel 22. In this fashion, the rotation of the wheel 22 is controlled by the rotation of shaft 26 of the motor 24. The coil 32 is wound in a spiral fashion such that it circumferentially envelops both the metallic toothed wheels 20 and 22. The coil is carried in an epoxy member 266 to provide electrical isolation. The coil 32 is provided with terminals for connection with the tachometer output circuit of FIG. 8. In the FIG. 10 preferred embodiment, the tachometer output circuit (not shown) can be conveniently mounted within the housing 256.

This tachometer arrangement is particularly suited for slip frequency control of an induction motor where substantial magnetic fields are present. This follows since the eddy current phenomenon which is utilized is not affected by the intensity of ambient magnetic fields. The use of aluminum wheels further enhances the operation of the tachometer in the slip frequency control application.

Although the foregoing has proceeded in terms of using the present invention in an induction motor slip speed control system, it is understood that this is merely one application of the present invention and is used by way of example and is not intended as a limitation as to potential applications of the tachometer.

We claim:

1. An electric tachometer for providing an indication of the combined rotational speed of two members, comprising: an annular AC inductive coil; first and second members disposed in a confronting spaced apart relationship interior to said inductive coil whereby, said inductive coil is located in proximity to the outer peripheral edges of both of said members, said members having electrically conductive sections of such a configuration that a varying eddy current loading effect is provided on said inductive coil as said members are rotated relative to each other; and detection means including a source of alternating current connected with said inductive coil for detecting the variations in the inductance of said coil which accompany relative rotation of the two members.

2. An electric tachometer for providing an indication of the combined rotational speed of two disc members, comprising: first and second disc members, each of said disc members provided with electrically conductive toothlike members spaced on its circumference; said disc members being disposed in a confronting spaced apart relationship; an RF inductive coil; said RF coil being disposed in proximity with and circumferentially encircling said first and said second disc members whereby, the instantaneous inductance of said RF coil is determined by the instantaneous relative positions of said disc members in accordance with the eddy current loading effect of said conductive toothlike members on said RF coil; a source of RF signals; means connecting said source of RF signals with said RF coil; and detection means connected with said RF coil for detecting the resultant amplitude modulation of the RF signal impressed across said RF coil which is correlated with the combined rotational speed of said disc members.

3. A control system for controlling the output frequency of a variable output frequency switching circuit coupled to an induction motor comprising: a first rotatable disc member adapted to be mechanically connected to the rotor of an induction motor, said first disc member provided with electrically conductive toothlike members spaced on its circumference; a second rotatable disc member adapted to be driven by a control device, said second disc member provided with electrically conductive toothlike members spaced on its circumference; an annular coil winding; means positioning said coil winding around the outer peripheral edges of said discs, the inductance of said coil winding varying as a function of the relative speed of rotation of said discs due to eddy currents induced in said discs; and a control circuit including a source of alternating current coupled to said coil winding operative to provide an output signal as a function of the varying inductance of said coil winding caused by relative rotation of said discs, said output signal adapted to be coupled to said switching circuit to control its output frequency.

4. An AC induction motor slip frequency control system for controlling the output frequency of an inverter coupled to an induction motor, comprising: an AC induction motor; an inverter connected with said induction motor to provide power to energize said motor during operating intervals, said inverter being capable of providing power at a controlled frequency; a first rotatable member, said first rotatable member being connected with said induction motor's rotor and being provided with electrically conductive toothlike members spaced on its circumference; a slip frequency control motor; a second rotatable member, said second rotatable member being connected with said slip frequency control motor and being provided with electrically conductive toothlike members spaced on its circumference; an RF inductive coil, said RF coil being disposed in proximity with and circumferentially encircling both said first rotatable member and said second rotatable member whereby, the instantaneous inductance of said RF coil is determined by the instantaneous relative positions of said rotatable members in accordance with the eddy current loading effect of said toothlike members on said RF coil; a source of RF signals; means connecting said source of RF signals across said RF coil whereby, the RF signal impressed upon said RF coil is amplitude modulated in accordance with the combined rotational speed of said rotatable members; and detection means connected with said RF coil for detecting the resultant amplitude modulation of the RF signal, said detection means providing an output signal which is adapted to control the output frequency of said inverter.